United States Patent [19]

Imazaike

[11] Patent Number: 5,128,816
[45] Date of Patent: Jul. 7, 1992

[54] AUTOMATIC CASSETTE CHANGER FOR FRONT LOADING TYPE MAGNETIC RECORDING-REPRODUCTION APPARATUS

[75] Inventor: Mikiharu Imazaike, Osaka, Japan

[73] Assignees: Matsushita Denki Sangyo Kabushiki Kaisha; Imazaike Seiko Kabushiki Kaisha, both of Osaka, Japan

[21] Appl. No.: 516,594

[22] Filed: Apr. 30, 1990

[30] Foreign Application Priority Data

May 13, 1989 [JP] Japan .................................. 1-119761
Nov. 24, 1989 [JP] Japan .................................. 1-307876

[51] Int. Cl.⁵ ............................................. G11B 15/68
[52] U.S. Cl. ................................................. 360/92
[58] Field of Search ........................ 360/92, 71, 85

[56] References Cited

U.S. PATENT DOCUMENTS

| | | | |
|---|---|---|---|
| 3,658,193 | 4/1972 | Gross | 360/92 |
| 4,160,281 | 7/1979 | Sato | 360/92 |
| 4,420,779 | 12/1983 | Takano et al. | 360/92 |
| 4,807,066 | 2/1989 | Imazaike | 360/92 |

FOREIGN PATENT DOCUMENTS

| | | | |
|---|---|---|---|
| 0153264 | 9/1983 | Japan | 360/92 |
| 0231454 | 10/1987 | Japan | 360/92 |
| 0200352 | 8/1988 | Japan | 360/92 |
| 0276746 | 11/1988 | Japan | 360/92 |

*Primary Examiner*—John H. Wolff
*Assistant Examiner*—Craig A. Renner
*Attorney, Agent, or Firm*—Jordan and Hamburg

[57] ABSTRACT

A cassette changer is mountable on a magnetic recording-reproduction apparatus having a cassette inlet-outlet opening. The cassette changer includes a new cassette housing portion for housing a new cassette to be inserted into the cassette inlet-outlet opening for recording or reproduction, a processed cassette housing portion provided below the new cassette housing portion for housing a processed cassette discharged from the cassette inlet-outlet opening after recording or reproduction, and a separator provided in a boundary portion of the new cassette housing portion and the processed cassette housing portion. The separator is pivotable between a cassette discharge position where only the processed cassette housing portion faces the cassette inlet-outlet opening with the new cassette in the new cassette housing portion being supported thereon and a cassette insertion position where the separator is pivoted downwardly from the cassette discharge position by the weight of the new cassette and only the new cassette housing portion faces the cassette inlet-outlet opening. A cassette withdrawing device transfers the processed cassette from the cassette inlet-outlet opening into the processed cassette housing portion when the separator is set in the cassette discharge position. A cassette insertion device transfer the new cassette from the new cassette housing portion to the cassette inlet-outlet opening when the separator is set in the cassette insertion position.

26 Claims, 12 Drawing Sheets

AUTOMATIC CASSETTE CHANGER FOR FRONT LOADING TYPE MAGNETIC RECORDING-REPRODUCTION APPARATUS

BACKGROUND OF THE INVENTION AND RELATED ART STATEMENT

The present invention relates to a cassette changer for automatically changing (inserting and discharging) dubbing or like tape cassettes for magnetic recording-reproduction apparatus of the front loading type, such as a video tape recorder (hereinafter referred to briefly as "VTR").

Conventionally, the above-mentioned type of cassette changer is known as shown in Japanese Unexamined Patent Publication No. 62-231454, which includes a cassette discharge path for allowing the recorded or reproduced cassette (hereinafter referred to as a "processed cassette"), discharged from a cassette inlet-outlet opening in front of the VTR, to slide down a slope, a cassette insertion path for horizontally moving and guiding another cassette for recording or reproduction (hereinafter referred to as a "new cassette") toward the cassette inlet-outlet opening, the insertion path intersecting the discharge path in front of the cassette inlet-outlet opening, and a separator pivotably supported at the intersection of the two paths, whereby the paths are changed over so that only one of them can communicate with the cassette inlet-outlet opening at the time of discharge or insertion of the cassette.

However, the conventional cassette changer requires at least a space for housing new cassettes in front of the separator (the side opposite to the cassette inlet-outlet opening side). Therefore, the changer becomes longer in the forward and rearward directions, that is, the changer is projected out of the VTR with an increased amount.

For this reason, in particular, when dubbing is performed in large quantities with a lot of VTRs arranged at the both sides of the passage, the cassette changers largely project into the passage. Consequently, this makes it difficult to perform a dubbing operation. Alternatively, this requires a widening of the passage by the projection. As a result of that, there is a problem that the space, in which the VTRs are provided, is reduced.

It is an object of the present invention to provide a cassette changer for magnetic recording-reproduction apparatus with a minimized length in the forward and rearward directions thereof.

SUMMARY OF THE INVENTION

The present invention provides a cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion provided below the new cassette housing portion for housing a processed cassette discharged from the cassette inlet-outlet opening after recording or reproduction, a separator provided in a boundary portion of the new cassette housing portion and the processed cassette housing portion and pivotable between a cassette discharge position where only the processed cassette housing portion faces the cassette inlet-outlet opening with the new cassette in the new cassette housing portion being supported thereon and a cassette insertion position where the separator is pivoted downward from the cassette discharge position by weight of the new cassette and only the new cassette housing portion faces the cassette inlet-outlet opening, spring means for biasing the separator toward the cassette discharge position, separator locking means for locking the separator in the cassette discharge position at the step of discharging the processed cassette and releasing the locking at the step of inserting the new cassette, cassette withdrawing means for transferring the processed cassette from the cassette inlet-outlet opening into the processed cassette housing portion when the separator is set in the cassette discharge position, cassette insertion means for transferring the new cassette from the new cassette housing portion to the cassette inlet-outlet opening when the separator is set in the cassette insertion position, and drive means for driving the cassette withdrawing means and the cassette insertion means.

With the above construction, cassettes are replaced by releasing the locking of the separator, pivoting the separator downward (lowering the new cassettes), inserting the cassette, raising and locking the separator and (allowing the next new cassettes to wait) and discharging the processed cassette. Namely, the new cassette housing portion is provided above the separator as a movable bottom wall. Therefore, the entire forward-rearward length of the cassette changer can be reduced by a length of a cassette housing portion, as compared with the conventional cassette changed having the new cassette housing portion provided in front of the separator.

The present invention provides a cassette changer in which a plurality of cassettes are stacked in stages in the new cassette housing portion and sequentially processed, further comprising cassette support means movable to an underside of the second lower new cassette to support the second lower new cassette or more at the step of inserting the lower most cassette by the cassette insertion means, and movable away from the underside of the second lower new cassette at the step of discharging the processed cassette.

With the above construction, cassettes are replaced by releasing the locking of the separator, pivoting the separator downward, inserting the lower most new cassette while supporting the second lower new cassette or more, raising and locking the separator and allowing the second lower new cassette or more to wait, and discharging the processed cassette. Namely, while the cassette changer of the present invention is smaller in the forward and rearward direction length, cassettes can be smoothly replaced even if the cassettes are stacked.

These and other objects, features and advantages of the present invention will become more apparent upon a reading of the following detailed description and drawings.

DESCRIPTION OF THE PREFERRED EMBODIMENTS

Figure 1:
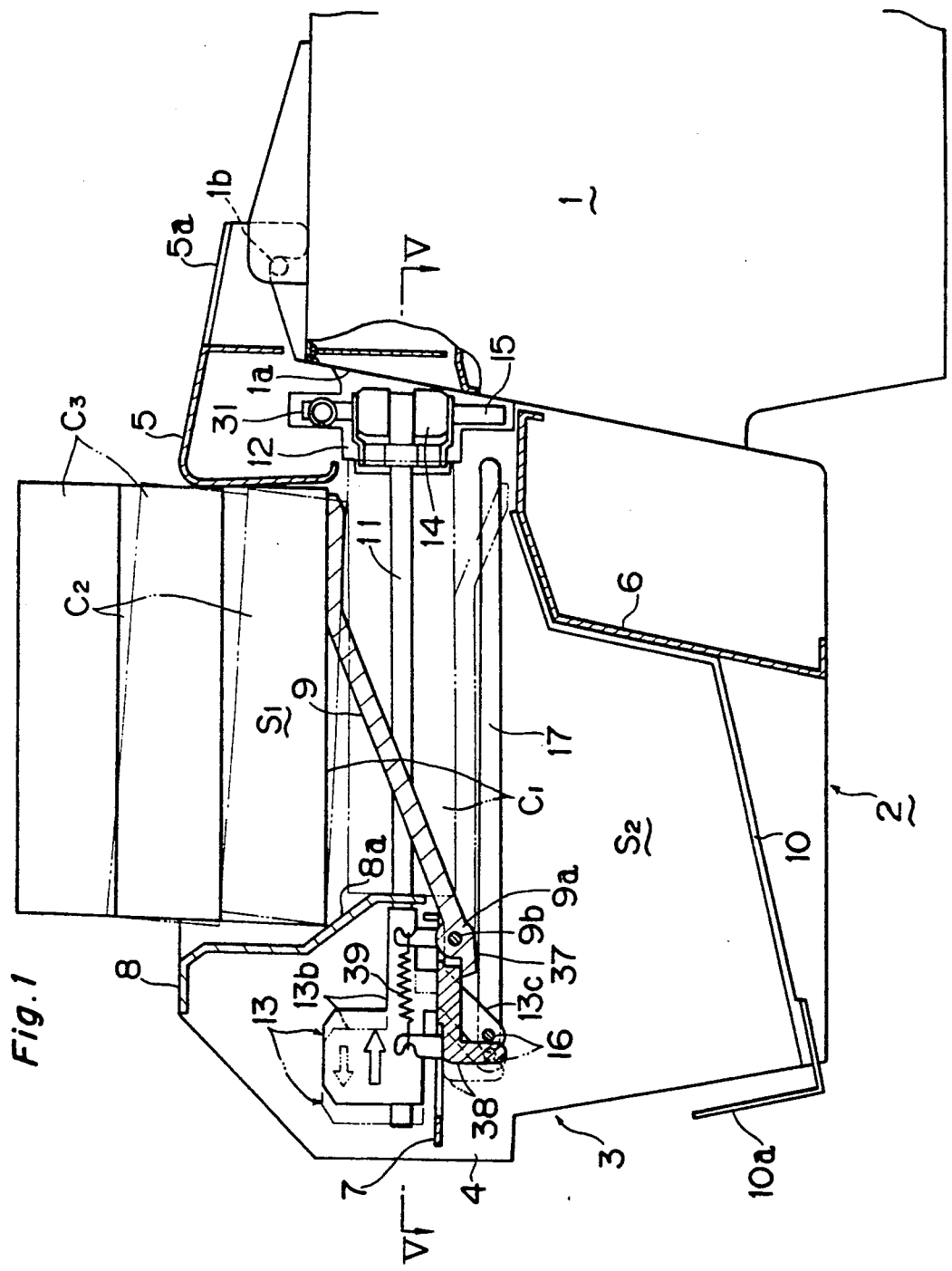
FIG. 1 is a view in partial vertical section showing a cassette changer of a first embodiment of the present invention, a cassette being to be inserted.

There will be described embodiments of the present invention with reference to the drawings.

FIGS. 1 to 8 show a first embodiment of the present invention. In the drawings, indicated at 1 is a VTR of the front loading type having a cassette inlet-outlet opening 1a in front thereof. The cassette inserted in the opening 1a of the VTR 1 is transported to a recording-reproduction position by a loading mechanism within the VTR and ejected to the opening 1a automatically after recording or reproduction.

Indicated at 2 is a cassette changer mounted on the VTR 1 at the front side thereof for discharging the cassette, ejected through the opening 1a, from the VTR and for transporting a new cassette into the opening 1a.

A body 3 of the cassette changer 2 comprises right and left side walls 4, 4, an upper frame 5 provided between rear upper portions of the side walls 4, 4, a lower frame 6 provided between rear lower portions of the side walls 4, 4, and a front frame 7 provided between front middle portions of the side walls 4, 4. Hooks 5a fixed on right and left ends of the upper frame 5 are hung on a pin 1b provided on a top front surface of the VTR 1, and thereby the body 3 is attached to the front side of the VTR 1.

A guide frame 8 is provided in a front upper portion of the body 3. A new cassette housing portion $S_1$ for housing a new cassette is defined by the guide frame 8, side walls 4, 4, and the upper frame 5. Provided below the new cassette housing portion $S_1$ is a processed cassette housing portion $S_2$ for housing a processed cassette discharged from the opening 1a. A separator 9 is provided in a boundary portion of the housing portions $S_1$ and $S_2$.

Provided on the guide frame 8 is a rearwardly downwardly inclined cassette support wall 8a for supporting the frond end of the cassette. Further, provided in the processed cassette housing portion $S_2$ are cassette receivers 10, 10 for supporting the processed cassette at both sides thereof. Cassette stoppers 10a, 10a are provided on the front end of the cassette receivers 10, 10.

Figure 3:
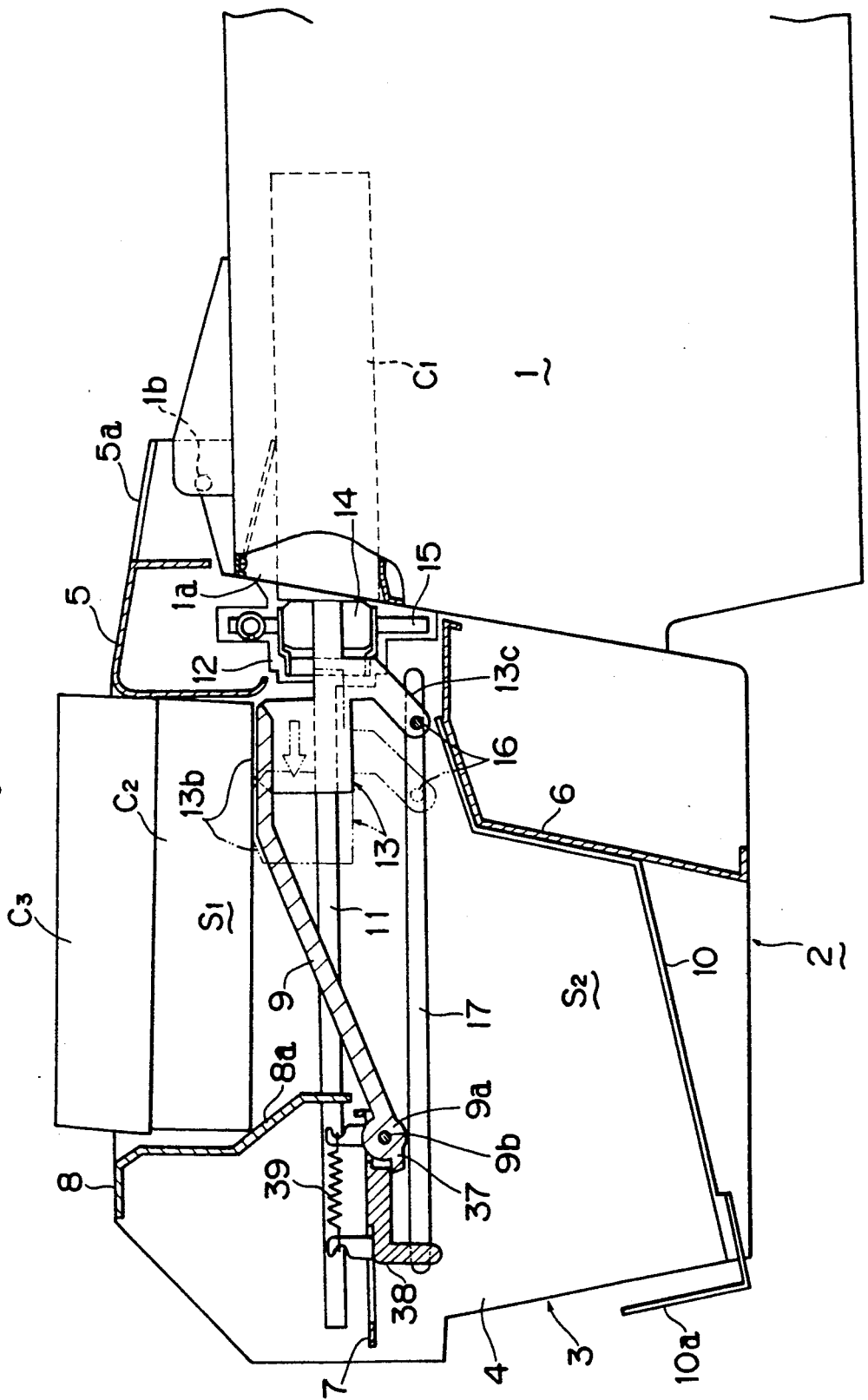
FIG. 3 is a view corresponding to FIG. 1, and showing the cassette changer, the cassette being finally inserted.
Figure 4:
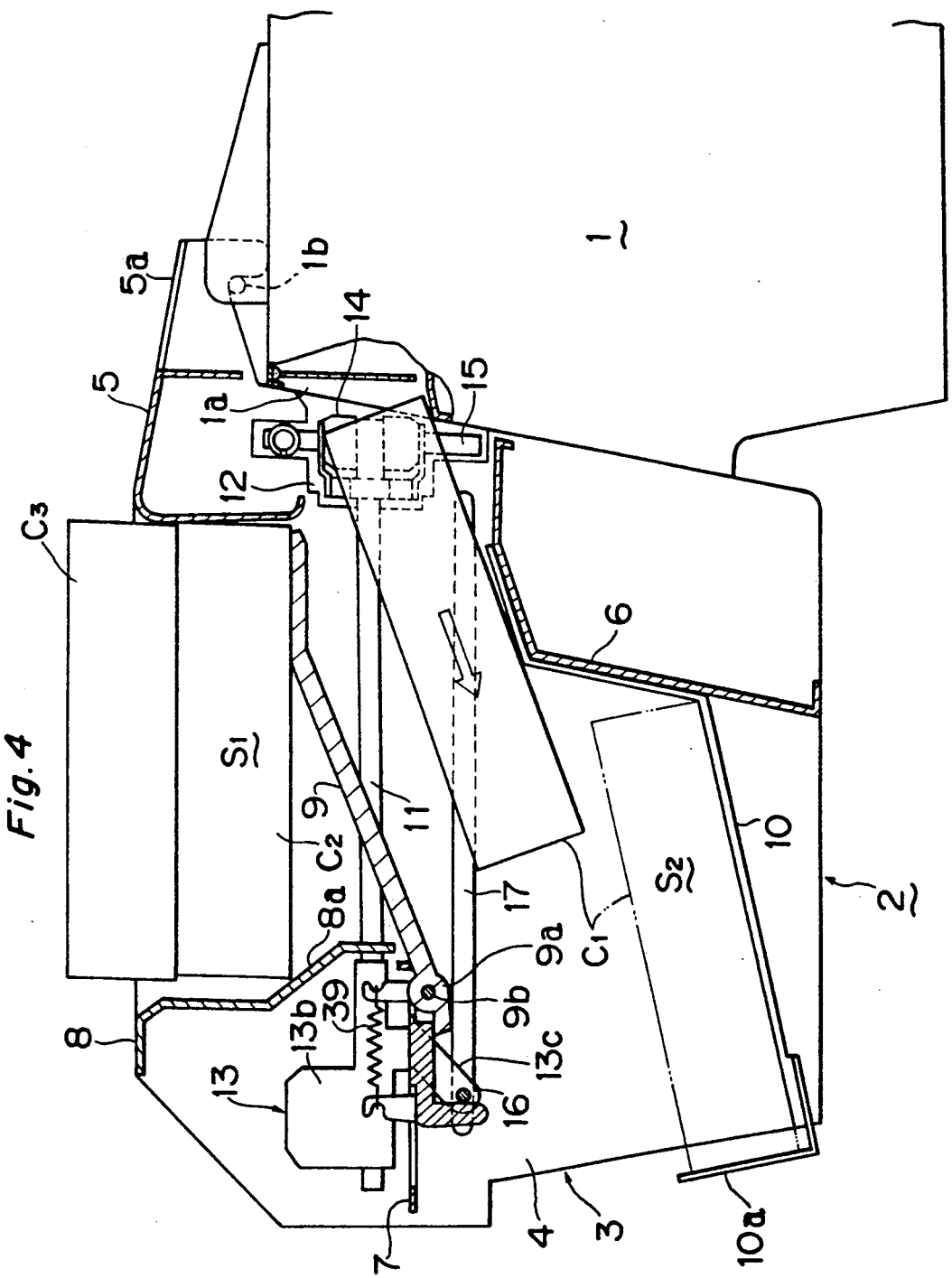
FIG. 4 is a view corresponding to FIG. 1, and showing the cassette changer, the cassette being discharged.

The separator 9 has hinge portions 9a, 9a projected forwardly on both sides of the front end portion and supported pivotally on the front frame 7 by a horizontal shaft 9b. The separator 9 is pivotable about the horizontal shaft 9b from a horizontal cassette insertion position where the processed cassette housing portion $S_2$ is closed and only the new cassette housing portion $S_1$ is made to face the opening 1a, as indicated in the phantom line in FIG. 1 and shown in FIG. 2, to a rearwardly upwardly inclined cassette discharge position where the new cassette housing portion $S_1$ is closed and only the processed cassette housing portion $S_2$ is made to face the opening 1a, as shown in FIGS. 1, 3, 4. Namely, the housing portions $S_1$ and $S_2$ are changed over by the separator 9. The processed cassette housing portion $S_2$ is communicated with the opening 1a at the time of discharging the cassette, while the new cassette housing portion $S_1$ is communicated with the opening 1a at the time of inserting the cassette.

First guide grooves 11, 11 are provided in the side walls 4, 4 in the forward and rearward directions and over approximately the entire length thereof in a position where the new cassette housing portion $S_1$ faces. Sliders 13, 13 as cassette insertion means are engaged with the first guide grooves 11, 11. Further, provided in rear end portions of the guide grooves 11, 11 are window holes 12, 12 for communicating the interior of the side walls with the exterior thereof. A pair of right and left withdrawing rollers 14, 14 as cassette withdrawing means are rotatably attached on vertical shafts 15, 15 provided in the window holes 12, 12.

Detailed description will be made on a structure and driving of the slider 13 and the withdrawing roller 14.

(I) Slider 13

Figure 5:
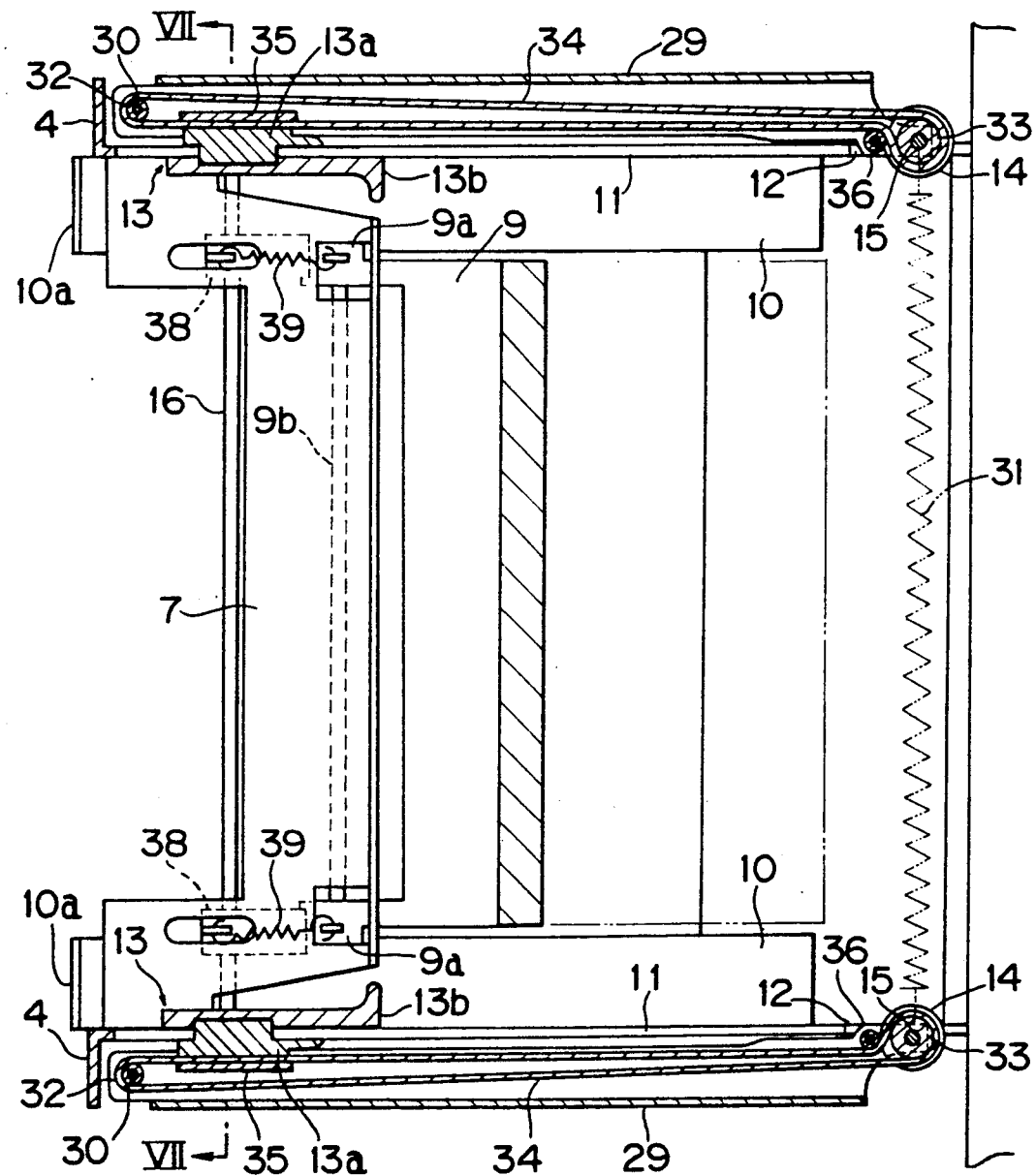
FIG. 5 is a view in section taken along the line V-V in FIG. 1.
Figure 7:
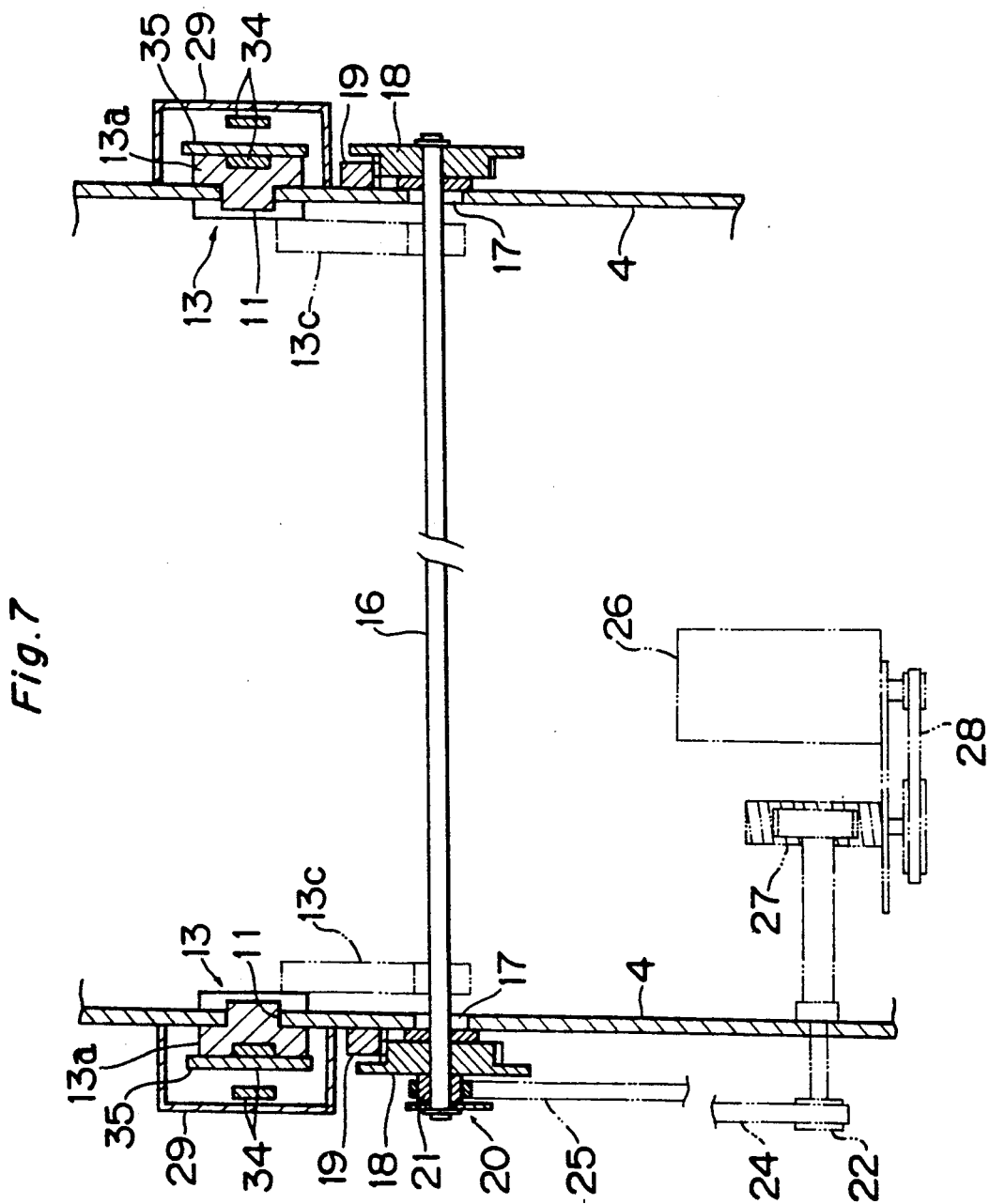
FIG. 7 is an enlarged view in section taken along the line VII—VII in FIG. 5.

As shown in FIGS. 5 and 7, the slider 13 has a construction wherein a guide portion 13a movable forwardly and rearwardly in the first guide groove 11, and a pushing pawl 13b for pushing the new cassette on the front side thereof are integrally connected by screws (not shown) or the like.

The slider 13 has a projected portion 13c provided on the underside of the pushing pawl 13b. The projected portions 13c and 13c of the sliders 13, 13 are connected with each other so that they can be integrally moved by a connecting rod 16.

Both ends of the connecting rod 16 extend through second guide grooves 17, 17 which are provided in the side walls 4, 4 in the forward and rearward directions below the first guide grooves 11, 11. The connecting rod 16 has pinion gears 18, 18 fixedly attached to the ends thereof. The pinion gears 18, 18 are engaged with rack gears 19, 19 which are fastened to outer surfaces of the side walls 4, 4 along the second guide grooves 17, 17.

Figure 6:
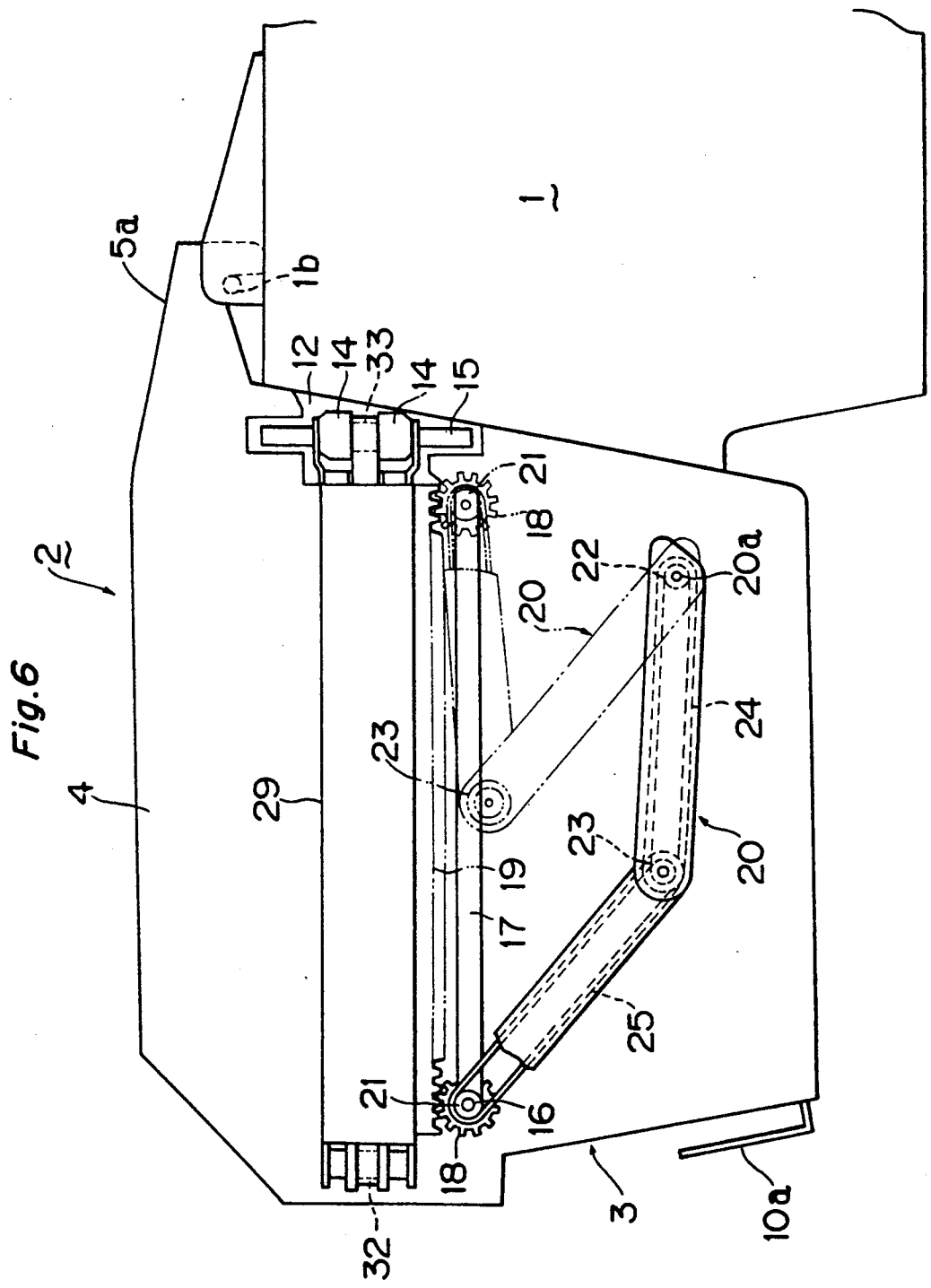
FIG. 6 is a side view of the cassette changer, a portion being brokenly taken away.

As shown in FIG. 6, a foldable link member 20 is provided on the outer surface of one side wall 4. One end of the link member 20 is attached to one end of the connecting rod 16. The other end of the link member 20 is pivotally attached on a horizontal shaft 20a provided in a rear portion of the side walls 4, 4.

The link member 20 has a driven pulley 21 provided coaxially with the pinion gear 18. Further, the link member 20 has a drive pulley 22 and a middle pulley 23 provided in the pivotal middle portions (folded point), respectively. A first belt 24 (a timing belt, the mentioned-below belts means timing belts) is passed over the drive pulley 22 and the middle pulley 23. A second belt 25 is passed over the middle pulley 23 and the driven pulley 21.

As shown in FIG. 7, the drive pulley 22 is connected with a drive motor 26 by a worm gear mechanism 27 and a belt transmission reduction mechanism 28. The drive motor 26 is provided in a front lower portion of the body 3 (below the lower frame 6). The rotational force of the drive motor 26 is reduced and then transmitted to one pinion gear 18 through the drive pulley 22, the middle pulley 23 and the driven pulley 21.

Accordingly, the pinion gear 18 is rotatingly moved in the forward and rearward directions with being engaged with the rack gear 19. The moving force of one pinion gear 18 is transmitted to the other pinion gear 18 through the connecting rod 16, and thereby the sliders 13, 13 are moved in the forward and rearward directions in synchronization with each other.

As will be discussed below, top surfaces of the pushing pawls 13b, 13b are set to be flush with or slightly higher than that of the separator 9 in the cassette discharge position so that the sliders 13, 13 can also serve as cassette support means for supporting the second lower new cassette or more at the step of inserting the cassette.

(II) Withdrawing rollers

Figure 8:
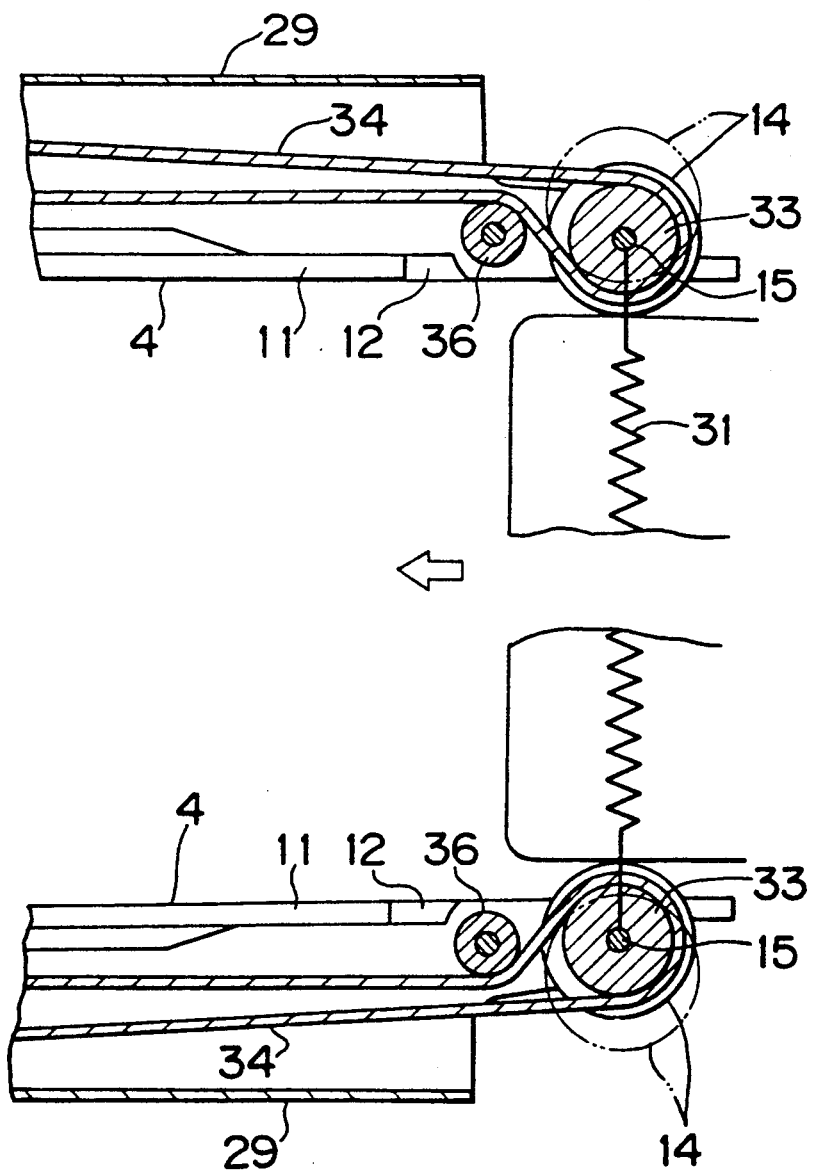
FIG. 8 is an enlarged view in horizontal section showing withdrawing rollers in the cassette changer.

As shown in FIGS. 5 and 8, roller support arms 29, 29 are provided on outsides of the side walls 4, 4. The roller arms 29, 29 are positioned at approximately the same level as the first guide grooves 11, 11 and in parallel with the first guide grooves 11, 11. The roller support arms 29 ,29 have front ends pivotally attached to the front ends of the side walls by a vertical shaft 30 and can be swung in right and left directions about the vertical shaft 30. The roller support arms 29, 29 have rear ends facing the window holes 12, 12 which are provided on the rear end portions of the first guide grooves 11, 11. The withdrawing rollers 14, 14 are mountd on the rear end portions of the roller support arms 29, 29 while being rotatable about the vertical shafts 15, 15.

Accordingly, the withdrawing rollers 14, 14 can be moved between a projected position where the withdrawing rollers 14, 14 are projected from the window holes 12, 12 to the inside of the side walls 4, 4 as indicated in the solid line in FIG. 8 and a retracted position where the withdrawing rollers 14, 14 are retracted to the outside of the side walls 4, 4 as indicated in the phantom line in FIG. 8 following the swing of the roller support arm 29 ,29.

A helical tension spring 31 (hereinafter referred to as a roller spring) is provided between the vertical shafts 15, 15 of the withdrawing rollers 14, 14. The withdrawing rollers 14, 14 are retained in the projected position by the roller spring 31.

As shown in FIGS. 5, 7 and 8, pulleys 32, 33 are fastened to the vertical shaft 30, being the swing pivot of the roller support arm 29, and the vertical shaft 15, being a rotary center of the withdrawing roller 14, respectively. A roller belt 34 is passed over the pulleys 32, 33. The guide portion 13a of the slider 13 is fixedly attached to the roller belt 34 through a fastening plate 35 by screws or the like, and thereby the moving force of the sliders 13, 13 are transmitted to the rollers 14, 14 as the rotational force.

In FIGS. 5 and 8, indicated at 36, 36 are idler pulleys for guiding the roller belt 34 on the withdrawing rollers 14, 14 sides.

When the sliders 13 ,13 are located as the rear end portions of the first guide grooves 11, 11 as indicated in the solid line in FIG. 3, the rear end portions of the roller support arms 29, 29 are pushed outwardly by the sliders 13, 13. Consequently, the withdrawing rollers 14, 14 are set in the retracted position indicated in the phantom line in FIG. 8. When the sliders 13, 13 are moved to the front portion of the first guide grooves 11, 11, the withdrawing rollers 14, 14 are returned to the projected position by elastic force of the roller spring 31.

On the other hand, forwardly projected pieces 37, 37 are integrally provided on the right and left hinge portions 9a, 9a of the separator 9. Lock members 38, 38 are provided on right and left sides of the front frame while being facing the projected pieces 37, 37. The lock members 38, 38 can be moved in the forward and rearward directions within a predetermined range. Helical tension spring 39, 39 are provided between the projected pieces 37, 37 and the lock members 38, 38 so that the separator 9 is biased to the cassette discharge position, and at the same time, the lock members 38, 38 are biased toward the projected pieces 37, 37.

With the separator 9 set in the cassette discharge position, the lock member 38 is biased rearward by the spring force. Thereby, the lock member 38 is in pressing contact with the projected piece 37 of the separator 9 as indicated in the solid line in FIG. 1. Consequently, upward rotation of the projected piece 37 is blocked (the separator 9 is locked in the cassette discharge position).

When the sliders 13, 13 reach a forward limit position as indicated in the phantom line in FIG. 1, the lock member 38 is pushed forward by the connecting rod 16 and leaves the projected piece 37. Thereby, the locking of the separator 9 is released.

The operation of the cassette change will be described below.

(i) Insertion of the cassette

The separator 9 is located in the cassette discharge position prior to the initiation of the operation as indicated in the solid line in FIG. 1. The lock member 38 is located in a locking position where it is made in pressing contact with the projected piece 37 of the separator 9. Therefore, the separator 9 is locked in the cassette discharge position, and new cassettes are housed in the new cassette housing portion $S_1$ while being horizontally supported on the separator 9.

FIG. 1 illustrates a state in which three cassettes $C_1$, $C_2$ and $C_3$ are stacked. The bottom, intermediate and top cassettes $C_1$, $C_2$ and $C_3$ will be hereinafter referred to as first, second and third cassettes, respectively.

In the above state, when a start signal is input to a control unit (not shown) by switch operation or the like, the slider 13 is moved to its forward limit position and thereby the lock member 38 is moved to the release position as indicated in the phantom line in FIG. 1. Consequently, the separator 9 is pivoted downward by the weight of the cassettes and automatically set to the cassette insertion position with the cassettes $C_1$, $C_2$ and $C_3$ placed thereon.

The movement of the separator 9 to the cassette insertion position is detected by a sensor (not shown). On the basis of a detection signal, the drive motor 26 is rotated and the slider 13 is moved backward. The slider 13 comes into contact with the front surface of the first cassette $C_1$ and pressingly moves the first cassette $C_1$ backward on the separator 9.

Figure 2:
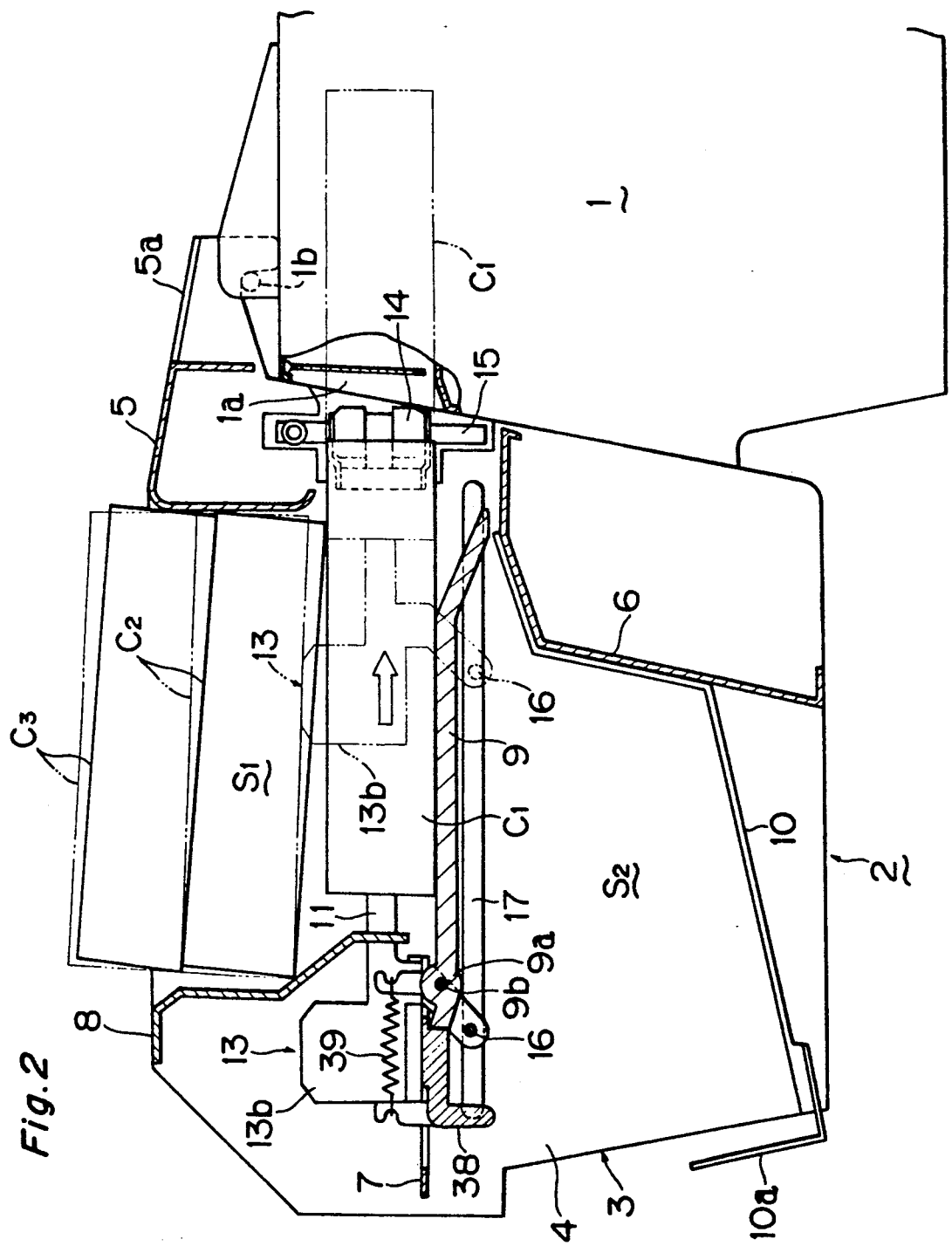
FIG. 2 is a view corresponding to FIG. 1, and showing the cassette changer, the cassette being inserted.

In the beginning of the backward movement of the first cassette $C_1$ by the slider 13, the front and rear ends of the second cassette $C_2$ are respectively supported on the cassette support wall 8a of the guide frame 8 and the top surface of the first cassette $C_1$ as indicated in the solide line in FIG. 2. After the middle of the movement of the first cassette $C_1$, the slider 13 comes under the bottom surface of the second cassette $C_2$ as indicated in the phantom line in FIG. 2 and shown in FIG. 3. Therefore, the second cassette $C_2$ is supportred with being slightly lifted up by the slider 13 and the cassette support wall 8a.

At the time of insertion of the cassette, the moving force of the slider 13 is transmitted to the withdrawing roller 14 and thereby the roller 14 is rotated in the same direction of the movement of the cassette. Therefore, when right and left sides of the rear end portion of the first cassette $C_1$ comes into contact with the withdrawing roller 14, the first cassette $C_1$ is inserted into the opening 1a by the roller 14 as indicated in the solid line in FIG. 2. Namely, the withdrawing roller 14 also serves as the cassette insertion means at the time of insertion of the cassette. Accordingly, the slider 13 is moved backward following the first cassette $C_1$ while the cassette is being inserted by the withdrawing roller 14. When the roller support arm 29 is pushed outward by the slider 13 and thereby the withdrawing roller 14 is moved to the retracted position as indicated in the phantom line in FIG. 8, the cassette $C_1$ is pressingly inserted into the VTR1 by the slider 13.

When the first cassette $C_1$ is inserted by the sliders 13, 13 and then leaves the separator 9, the separator 9 is automatically returned to the cassette discharge position by the spring force of the lock spring 39 as shown in FIG. 3 and locked in the same position by the lock member 38.

After completion of the insertion, the motor 26 is inversely rotated and the slider 13 is moved forward in accordance with a signal from the sensor which detects that the slider 13 has reached its rearward limit position. The motor 26 is stopped in accordance with a signal from the sensor which detects that the slider 13 has moved forward. Consequently, the slider 13 is stopped slightly ahead of the rearward limit position and set to a waiting position where the cassette to be ejected be made not to come into contact with the slider 13 as indicated in the phantom line in FIG. 3.

(ii) Discharge of the cassette

When the recording or reproduction of the first cassette $C_1$ is completed and the first cassette $C_1$ is ejected from the opening 1a, the motor 26 is inversely rotated in accordance with a signal of the sensor. Thereby, the withdrawing rollers 14, 14 are rotated in the discharge direction and at the same time, the slider 13, 13 are moved forward.

Before the sliders 13, 13 are moved forward, the withdrawing rollers 14, 14 are located in the retracted position as indicated in the phantom line in FIG. 8 and face the right and left sides of the cassette $C_1$. As soon as the sliders 13, 13 are moved forward, the withdrawing rollers 14, 14 are moved to the projected position as indicated in the solid line in FIG. 8 and come into contact with front side portions of the cassette $C_1$. According to the rotation of the withdrawing rollers 14, 14, the first cassette $C_1$ is withdrawn, slipped out of the opening 1a, and thereby housed in the processed cassette housing portion $S_2$ as shown in FIG. 4.

On the other hand, the sliders 13, 13 are only moved forward and returned to its original position at the time of discharge of the processed cassette. When the sliders 13, 13 are returned to the original position, a rear portion of the second cassete $C_2$ is caused to be supported by the separator 9 in place of the sliders 13, 13.

Thereafter, the above operation is automatically repeated, that is, the insertion of the second cassette $C_2$, recording or reproduction, discharge of the second cassette $C_2$ and insertion of the third cassetts $C_3$ are performed.

In the above case, three cassettes are stacked. However, it will be noted that if a greater upper space can be available, a guide frame may be provided above the new cassette housing portion $S_1$ to make it possible to stack four cassettes or more. Alternatively, cassettes may be supplied to the new cassette housing portion $S_1$ one by one.

As described above, the new cassette housing portion $S_1$ and the processed cassettte housing portion $S_2$ are respectively provided above and below the separator 9 in the cassette changer 2. The separator 9 is pivoted between the cassette insertion position and the cassette discharge position so that the insertion and discharge of the cassette are performed. Accordingly, comparing to the cassette changer of Japanese Unexamined Patent Publication No. 62-231454 in which a new cassette housing portion is provided in front of a separator, the size of cassette changer is reduced in respect of the forward and rearward directions.

At the step of insertion of the cassette, the cassettes over the first lower cassette are supported by the sliders 13, 13 and kept at the upper positions. Therefore, this cassette changer is sufficiently applicable for a manner in which a plurality of cassettes are stacked. Further, the cassettes over the first lower cassette are supported by the first cassette being inserted at the beginning of insertion of the cassette, and they are supported by the sliders 13, 13 after the middle of the insertion operation of the cassette. Therefore, the cassette support can be securely and smoothly changed over without timing error or the like.

Since the sliders 13, 13 serve not only as the cassette insertion means but also as cassette support means, the construction is simpler, as compared with a conventional cassette changer in which a special cassette support mechanism is separately provided.

Furthermore, this cassette changer, in which the cassette is inserted with the front right and left sides thereof pushed by the sliders 13, 13, is simpler in construction and the moving stroke of cassette can be made larger, as compared with a conventional cassette changer in which the cassette is inserted by rotating a horizontal arm, another conventional cassette changer in which the cassette is inserted with being placed on a belt conveyer or the like. In addition, since there is no likelihood of cassette slippage, the cassette can be inserted with an increased assurance.

Moreover, the sliders 13, 13 are driven by the engagement of the pinion gear 18 with the rack gear 19. Therefore, there is no likelihood of the slippage, as compared with a conventional cassette changer in which a slider is driven by rollers. Further, the pinion gears 18, 18 are connected with each other by the connecting rod 16, and the sliders 13, 13 are interlockingly moved. Therefore, even if the slippage or the like occurs in the belt transmission mechanism in which the rotational force of the motor 26 is transmitted to one pinion gear 18 (first and second belts 24, 25 and pulleys 21, 22 and 23 in FIG. 6), the pinion gears 18, 18 are thereby influenced equally. Accordingly, mal-synchronization can be eliminated which is liable to occur in a construction in which the opposite side rollers are driven in separate drive systems. Specifically, if a slippage occurs in one of the two drive systems, only the roller of the other drive system will advance. Such mal-synchronization is prevented in the cassette changer of the present invention. For this reason, even if slippage occurs, the sliders 13, 13 are kept in the same position. Therefore, restoration can be performed easily.

Figure 9:
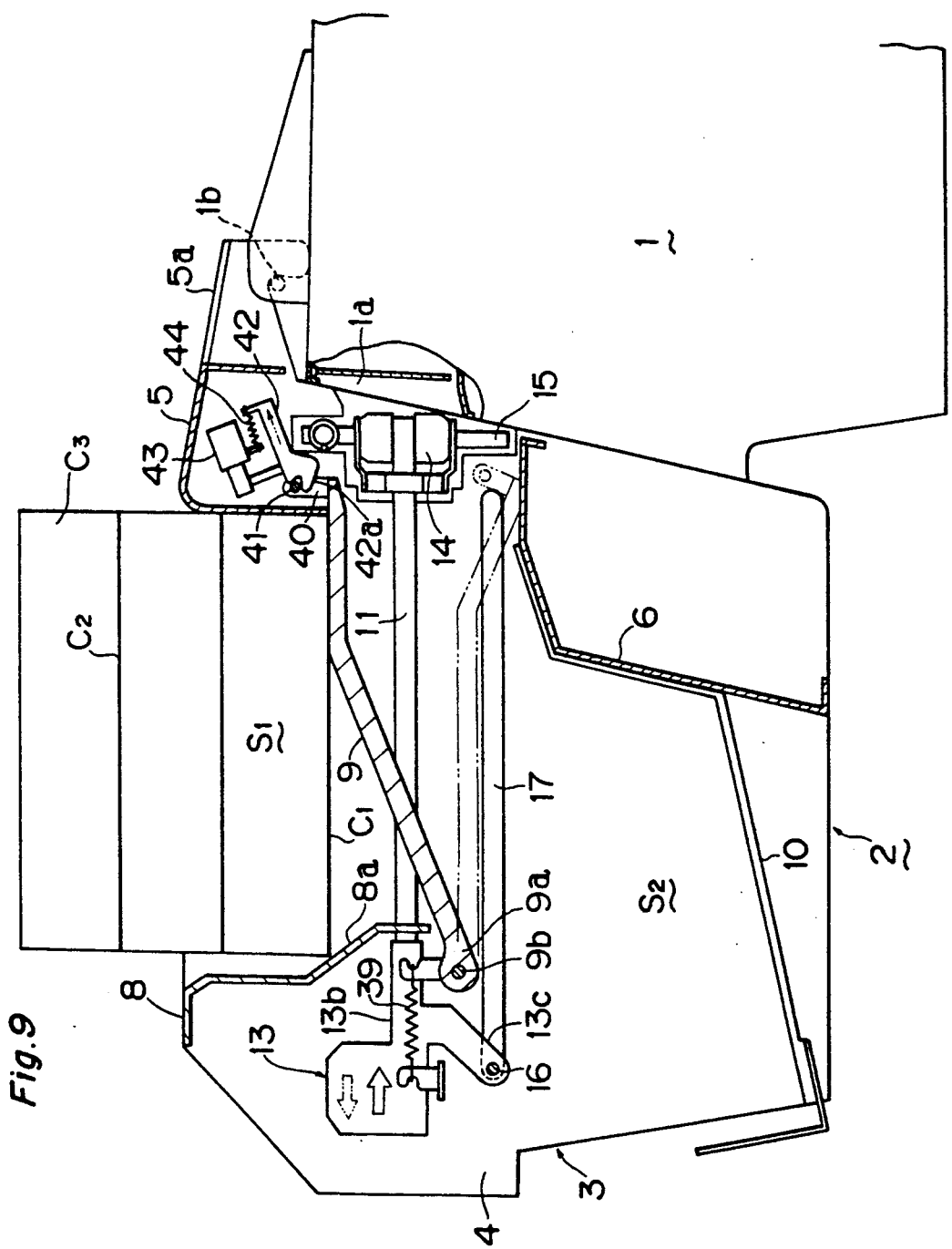
FIG. 9 is a view corresponding to FIG. 1 and showing a second embodiment of the present invention.

FIG. 9 shows a second embodiment of the present invention. There will be described only differences from the first emboidment described above.

On the idle end portion of the separator 9, a pair of right and left projections 41 (one of them is shown in the drawing) is provided on a right-left directional middle portion. A lock pin 41 is horizontally provided between the projections. On the other hand, provided in a right-left directional middle portion of the upper frame 5 is a latch type lock memer 42 which can slide forward and rearward and engage with or disengage from the lock pin 41 and electromagnet 43 for releasing the lock member 42 from the lock pin 41. Provided between a case (fixing portion) of the electromagnet 43 and the lock member 42 is a helical tension spring 44 for applying the spring force in a direction that the lock pin 41 is engaged with the lock member 42.

Indicated in the solid line in FIG. 9 is a state in which the lock member 42 is engaged with the lock pin 41 and the separator 9 is locked in the cassette discharge position. If the electromagnet 43 is energized at the time of insertion of the cassette, the lock member 42 is moved in the direction of an arrow indicated in the phantom line in FIG. 9 by the electromagnet 43 to release the locking. After the locking is released and thereby the separator 9 is pivoted downward as indicated in the phantom line, the energization to the electromagnet 43 is shut off and the lock member 42 is returned to its original locking position by the spring 44. When the separator 9 is returned to the cassette discharge position after the insertion of the cassette, the lock pin 41 comes into contact with an inclined surface 42a of the lock member 42 and thereby the lock member 42 is once pushed back to the locking release position. Thereafter, the locking state shown in FIG. 9 is automatically restored.

Accordingly, in this construction in which the idle end of the separator 9 is supported, the load supporting force of the separator 9 is increased. Therefore, the above construction is particularly advantageous to a cassette changer in which a plurality of casettes are stacked.

It will be noted that the construction in which the lock member is slid between the locking position and the locking release position by the electromagnet can be applied to the first embodiment in which the separator locking means is provided on the pivotal side of the separator 9.

Figure 10:
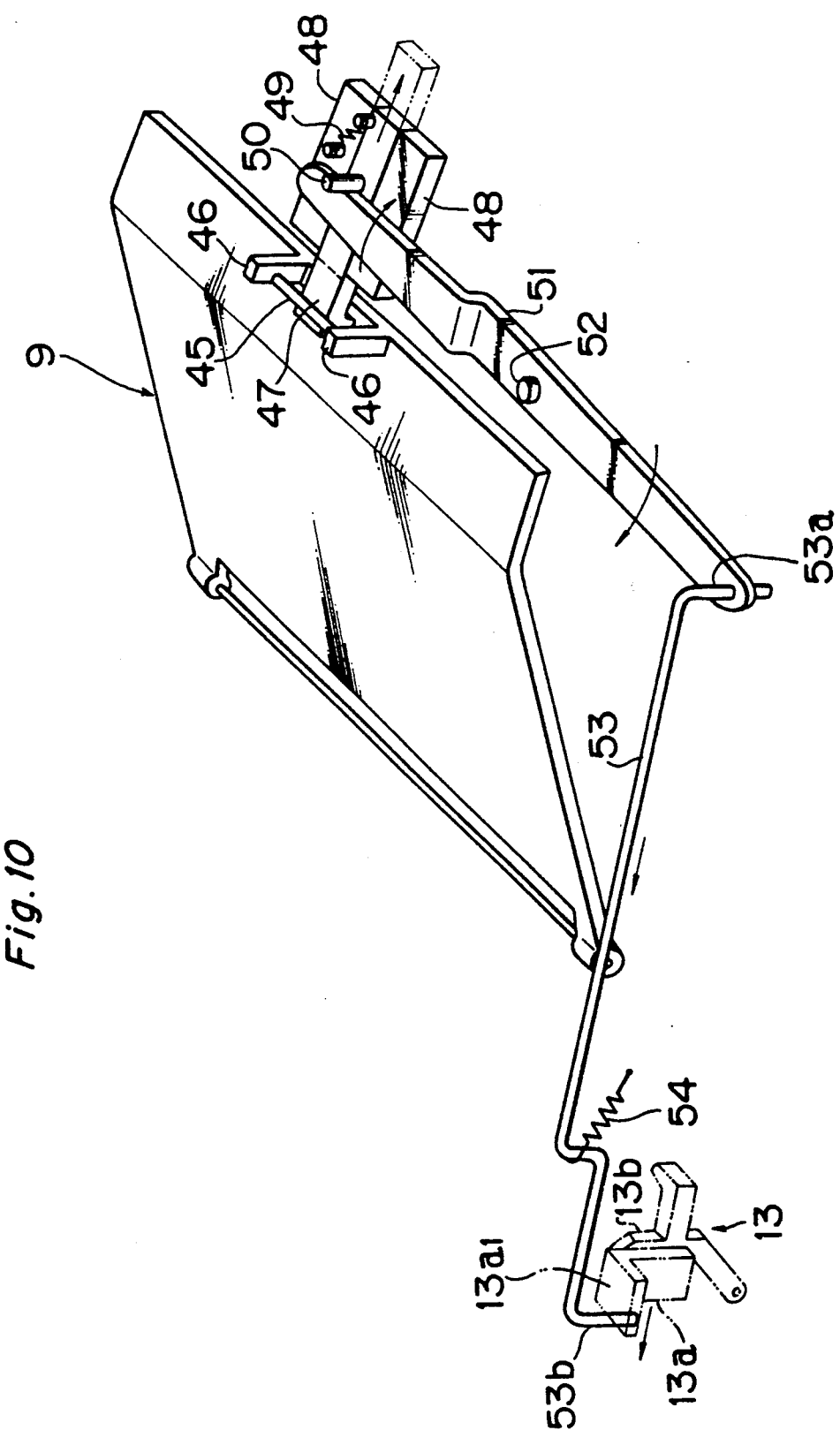
FIG. 10 is a perspective view showing a third embodiment of the present invention.

FIG. 10 shows a third embodiment of the present invention.

In the third embodiment, the separator locking means is provided on the idle end slide of the separator 9. The lock member is moved between the locking position and the locking release position with use of the driving force of the slider 13.

Specifically, a lock pin 45 is horizontally mounted on a top surface of an idle end portion of the separator 9 by the pair of right and left projections 46, 46 in similar to the second embodiment. In addition, a latch type lock member 47 is provided in a right-left directional middle portion of the upper frame of the body (not shown). The lock member 47 is slid in the forward and backward directions and is engaged with or disengaged from the lock pin 45. Indicated at 48, 48 are slide guide plates of the lock member 47. Indicated at 49 is a lock spring for holding the lock member 47 in the locking position.

An operation shaft 50 is projected from a top surface of the lock member 47. The operation shaft 50 is pushed backward (to the right side in FIG. 10) by a locking release lever 51 and thereby the lock member 47 is moved to the locking release position.

The locking release lever 51 is horizontally sidewisely attached to the upper frame of the body with its middle portion pivotally supported by a vertical shaft 52. The locking release level 51 has one end thereof positioned in front of the operation shaft 50.

The locking release lever 51 has the other end connected with a rear end folded portion 53a of an operation rod 53 which is slidably provided on an outer surface of the side wall of the body (not shown) in the forward and backward directions. A front end folded portion 53b of the operation rod 53 is positioned in front of the guide portion 13a of the slider 13. Indicated at 13a is an operation rod pushing piece which is provided integrally with the guide portion 13a. Indicated at 54 is an operation rod returning spring for biasing the operation rod 53 backward.

FIG. 10 shows a state in which the lock member 47 is positioned below the lock pin 45 and the separator 9 is locked in the cassette discharge position.

In this state, when the slider 13 is moved to the forward limit position at the time of insertion of the cassette, each part is operated in the directions of arrows in FIG. 10. Specifically, the operation rod 53 is pushed forward by the operation rod pushing piece 13a of the guide portion 13a of the slider 13. Thereby, the locking release lever 51 is rotated in a clockwise direction in FIG. 10 and the lock member 47 is pushed backward by one end of the locking release lever 51. Consequently, the lock member 47 is moved away from the lock pin 45 so that the locking of the separator 9 is released as indicated in the phantom line in FIG. 10.

In this case, the separator 9 is pivoted downward by weight of the cassettes, and the cassette is then inserted by the slider 13. Subsequently, the separator 9 is automatically returned to the cassette discharge position. Consequently, the lock pin 45 is automatically engaged with the lock member 47 by latch action to return to the locking state.

The above construction has the advantage of the first embodiment that the operation may be surely performed because the electromagnet is not used as well as the advantage of the second embodiment that the load supporting force of the separator 9 is greater because the separator 9 is supported by the idle end side thereof.

Figure 11:
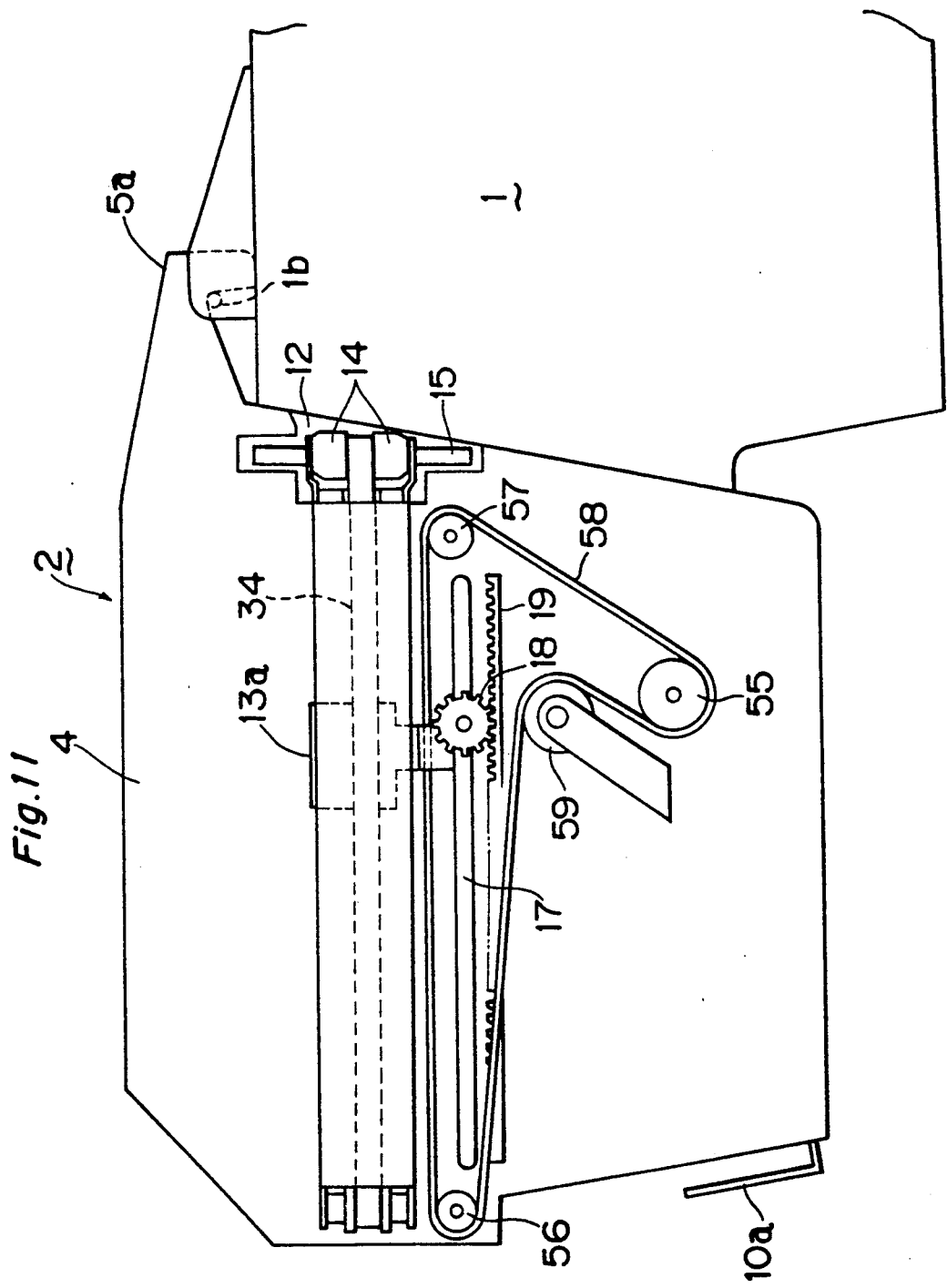
FIG. 11 is a side view showing a fourth embodiment of the present invention.
Figure 12:
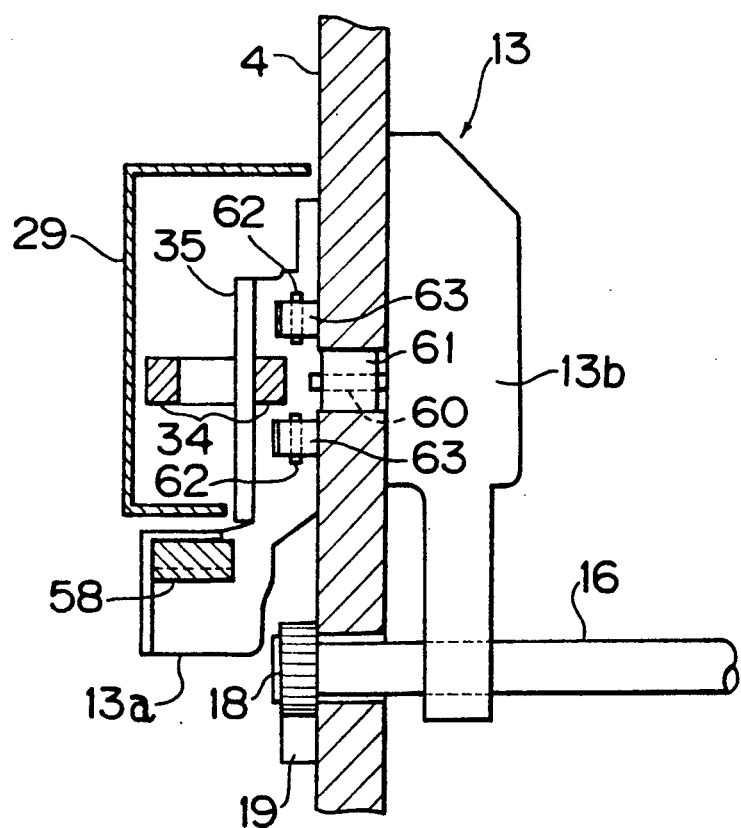
FIG. 12 is an enlarged view in section showing a portion of the fourth embodiment of the present invention.

FIGS. 11 and 12 show a fourth embodiment of the present invention.

In the fourth embodiment, the slider 13 and the transmission mechanism for transmitting the rotational force of the drive motor to one of the pinion gears are constructed differently from the first embodiment.

There will be described only differences from the first embodiment. A drive pulley 55 driven by a motor (not shown) is provided on a lower portion of an outer surface of one side wall 4 of the body. Driven pulleys 56, 57 are provided in front of and in rear of the second guide groove 17 respectively. An endless belt 58 (timing belt) is passed over the pulleys 55, 56, 57 to surround the second guide groove 17. The guide portion 13a of the slider 13 is a fixed to a portion of the belt 58 which is parallel with the second guide groove 17. Indicated at 59 is a tension pulley.

In the first embodiment, the rotational force of the belt 58 is transmitted to one slider 13 through one pinion gear 18. In the fourth embodiment, conversely, the rotational force of the belt 58 is transmitted to one pinion gear 18 through one slider 13. Similar to the first embodiment, the rotational force of one pinion gear 18 is transmitted to the other pinion gear 18 through the connecting rod 16 and thereby the right and left sliders 13, 13 (only one of them is shown) are synchronously moved in the forward and rearward directions.

With the fourth embodiment, since the motor driving force is transmitted to the slider 13 (pinion gear 18) by one belt, i.e., the belt 58, a belt having a greater width can be used, as compared with the first embodiment in which two belts (24, 25 in FIG. 7) are used. For this reason, the strength of the belt is increased. Therefore, ther is less possibility that the belt will be extended or broken off.

As shown in FIG. 12, provided on the guide portion 13a of the slider 13 are a pair of forward and rearward horizontal rollers 61, 61 (only one of them is shown) rotatable about a horizontal shaft 60 in the first guide groove 11 and a pair of upper and lower vertical rollers 63, 63 rotatable vertical shafts 62, 62 on outer surfaces of the side walls, 4, 4.

Consequently, the horizontal roller 61 holds the slider 13 in a horizontal position and decreases its sliding resistance. In addition, the vertical rollers 63, 63 decrease frictional resistance of the slider 13 to the outer surface of the side wall 4 when the slider 13 moves the roller support arm 29 outward.

In addition to the foregoing embodiments, the present invention can be embodied with the following modifications.

(a) a plurality of pairs of rollers may be provided on the right and left sides of the new cassette housing portion $S_1$ for inserting the new cassette.

(b) In place of the withdrawing rollers, 14, 14 chuck members catchable with the cassette at the right and left sides thereof and movable in the forward and rearward directions may be used to constitute the cassette withdrawing means.

As described above, the new cassette housing portion and the processed cassette housing portion are provided above and below the separator, respectively. Further, the cassettes are inserted or discharged by pivoting the separator between the cassette insertion position and the discharge position. Therefore, the entire forward-rearward length of a cassette changer can be reduced by a length of a new cassette housing portion, as compared with the conventional cassette changer provided with the new cassette housing portion in front of the separator.

Accordingly, the projection of the cassette changer ahead of the VTR is reduced. Therefore, when the dubbing is to be performed in large quantities with a lot of VTRs arranged on both sides of a passge, the width of the passage can be decreased by the cassette changer with a minimized amount. For this reason, the dubbing operation can be performed smoothly even in an already provided passage.

According to the present invention, also, cassette are replaced by releasing the locking of the separator, pivoting the separator downward, inserting the lower most new cassette while supporting the second lower new cassette or more, raising and locking the separator and allowing the second lower new casstte or more to wait. and discharging the processed cassette. Namely, while the cassette changer is smaller in the forward and rearward direction length, cassettes can be replaced smoothly even if a plurality of cassette are stacked.

Further, the new cassette is inserted into the cassette inlet-outlet opening while being pressed at the front sides thereof by the pair of right and left sliders. Therefore, there is less possibility of the cassette slippage or the like. The cassette can be inserted reliably, as compared with a conventional cassette changer in which the cassette is inserted while being placed on a belt conveyer.

Further, since both sliders are driven by the engagement of the rack gear with the pinion gear and are interlocked by the connecting rod, the sliders can be surely synchronized even if the slippage or the like occurs in the transmission mechanism. Accordingly, there is less possibility that the sliders will be out of synchronization (or phase) unlike a conventional cassette changer in which sliders are separately driven by the rollers. For this reason, even if trouble occurs, restoration can be performed easily and rapidly.

Further, since the sliders can serve as cassette support means, the cassette changer can be made simpler in construction, as compared with a conventional cassette changer in which the cassette support means is separately provided. Further, the sliders come under the underside of the second lower new cassette at the step of inserting the new cassette and moves away from the underside of the second lower new cassette at the step of discharging the processed cassette. Therefore, the support of the second lower new cassette or more can be practiced with a sure and smooth changing timing.

Further, the separator can be surely locked in the cassette discharge position.

Moreover, the separator is locked at the idle end side thereof in the cassette discharge position. Therefore, the load supporting force of the separator is increased. In particular, in the case that a plurality of cassettes are stacked, the plurality of cassettes can be stably supported on the separator.

Furthermore, it would be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivotable between a cassette discharge position where only said processed cassette housing portion faces said cassette inlet-outlet opening with said new cassette in said new cassette housing portion being supported on said separator and a cassette insertion position where said separator is pivoted downwardly from said cassette discharge position by the weight of said new cassette and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, cassette withdrawing means for transferring said processed cassette from said cassette inlet-outlet opening into said processed cassette housing portion when said separator is in said cassette discharge position, cassette insertion means for transferring said new cassette from said new cassette housing portion into said cassette inlet-outlet opening when said separator is in said cassette insertion position, and drive means for driving said cassette withdrawing means and said cassette insertion means.

2. A cassette changer as defined in claim 1, wherein said cassette insertion means comprises a pair of spaced slider means which are movable while engaging said new cassette, said drive means comprising spaced rack gears fixed on said new cassette housing portion, pinion gears mounted on each of said slider means and respectively engaged with said rack gears, said drive means further comprising a drive motor and a transmission mechanism for transmitting the rotational force of said drive motor to one of said pinion gears, and a connecting rod connecting the pinion gears to rotate together.

3. A cassette changer as defined in claim 2, wherein said transmission mechanism comprises spaced driven pulleys, a drive pulley driven by said drive motor, a belt passing over said driven pulleys and said drive pulley and being fixedly attached to said slider means so that the rotational force of said drive motor is transmitted to said one pinion gear.

4. A cassette changer mountable on a magnetic recording-reproduction apparatus, the magnetic recording-reproduction apparatus having a cassette inlet-outlet opening, the cassette changer comprising a new cassette housing portion for housing a plurality of new cassettes to be inserted into the cassette inlet-outlet opening for recording or reproduction, said plurality of new cassettes being stacked above the other in vertical array, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivotable between a cassette discharge position where only the processed cassette housing portion faces said cassette inlet-outlet opening with said plurality of new cassettes stacked in said new cassette housing portion being supported on said separator and a cassette insertion position where said separator is pivoted downwardly from said cassette discharge position by the weight of said new cassettes and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, cassette withdrawing means for transferring said processed cassette from said cassette inlet-outlet opening into said processed cassette housing portion when said separator is in said cassette discharge position, cassette insertion means for transferring a lowermost of said vertically arrayed new cassettes in said new cassette housing portion into said cassette inlet-outlet opening when said separator is in said cassette insertion position, drive means for driving said cassette withdrawing means and said cassette insertion means, and cassette support means movable to underlie a second lowermost of said vertically arrayed new cassettes to support said second lowermost new cassette as said cassette insertion means transfers said lowermost new cassette into said inlet-outlet opening, said cassette support means being movable to a position displaced from underlying said second lowermost new cassette upon said cassette withdrawing means transferring said processed cassette from said cassette inlet-outlet opening into said processed cassette housing portion.

5. A cassette changer as defined in claim 4, wherein said cassette insertion means comprises a pair of spaced slider means which are movable while engaging the lowermost of said plurality of new cassettes, said drive means comprising spaced rack gears fixed on said new cassette housing portion, pinion gears mounted on each of said slider means and respectively engaged with said rack gears, said drive means further comprising a drive motor and a transmission mechanism for transmitting the rotational force of said drive motor to one of said pinion gears, and a connecting rod connecting the pinion gears to rotate together.

6. A cassette changer as defined in claim 5, wherein said transmission mechanism comprises spaced driven pulleys, a drive pulley driven by said drive motor, a belt passing over said driven pulleys and said drive pulley and being fixedly attached to said slider means so that the rotational force of said drive motor is transmitted to said one pinion gear.

7. A cassette changer as defined in claim 4, wherein said cassette insertion means comprises spaced sliders which are movable while engaging the lowermost of said plurality of new cassettes, said sliders each having a top surface which are positioned so as to be flush with or higher than that of said separator when said separator is in said cassette discharge position, said top surface constituting said cassette support means.

8. A cassette changer as defined in claim 7, wherein said drive means comprises spaced driven pulleys, a drive pulley driven by a drive motor, a belt passing over said driven pulleys and said drive pulley and being fixedly attached to said slider means so that the rotational force of said drive motor drives said sliders.

9. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivotable between a cassette discharge position where only said processed cassette housing portion faces said cassette inlet-outlet opening with said new cassette in said new cassette housing portion being supported on said separator and a cassette insertion position where said separator is pivoted downwardly from said cassette discharge position by the weight of said new cassette and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, cassette withdrawing means for transferring said processed cassette from said cassette inlet-outlet opening into said processed cassette housing portion when said separator is in said cassette discharge position, cassette insertion means for transferring said new cassette from said new cassette housing portion into said cassette inlet-outlet opening when said separator is in said cassette insertion position, and drive means for driving said cassette withdrawing means and said cassette insertion means, said cassette insertion means comprises a pair of spaced slider means which are movable while engaging said new cassette, said drive means comprising spaced rack gears fixed on said new cassette housing portion, pinion gears attached to each of said slider means and respectively engaged with said rack gears, a drive motor, a transmission mechanism for transmitting the rotational force os said drive motor to one of said pinion gears, and a connecting rod connecting said pinion gears to rotate together, said cassette insertion means comprising a first and second link member each having one pivotably connected to one another at a first pivot shaft, said first link member having its other end connected to a connecting portion of said connecting rod, a drive pulley mounted on the other end of said second link member, said drive motor driving said drive pulley, a middle pulley means on said first pivot shaft, a driven pulley on said connecting portion of said connecting rod, a first belt passing over said drive pulley and said middle pulley means, a second belt passing over said driven pulley and said middle pulley means such that the rotational force of said drive motor is transmitted via said drive pulley, said middle pulley means, said driven pulley and said first and second belts to drive said slider means.

10. A cassette changer mountable on a magnetic recording-reproduction apparatus, the magnetic recording-reproduction apparatus having a cassette inlet-outlet opening, the cassette changer comprising a new cassette housing portion for housing a plurality of new cassettes to be inserted into the cassette inlet-outlet opening for recording or reproduction, said plurality of new cassettes being stacked one above the other in vertical array, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivtable between a cassette discharge position where only the processed cassette housing portion faces said cassette inlet-outlet opening with said plurality of new cassettes stacked in said new cassette housing portion being supported on said separator and a cassette insertion position where said separator is pivoted downwardly from said cassette discharge position by the weight of said new cassettes and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, cassette withdrawing means for transferring said processed cassette from said cassette inlet-outlet opening into said processed cassette housing portion when said separator is in said cassette discharge position, cassette insertion means for transferring a lowermost of said vertically arrayed new cassettes in said new cassette housing portion into said cassette inlet-outlet opening when said separator is in said cassette insertion position, drive means for driving said cassette withdrawing means and said cassette insertion means, and cassette support means movale to underlie a second lowermost of said vertically arrayed new cassettes to support said second lowermost new cassette as said in cassette insertion means transfers said lowermost new cassette into said inlet-outlet opening, said cassette support means being movable to a position displaced from underlying said second lowermost new cassette upon said cassette withdrawing means transferring said processed cassette from said cassette inlet-outlet opening into said processed cassette housing portion, said cassette insertion means comprising a pair of spaced slider means which are movable while engaging the lowermost of said plurality of new cassettes, said drive means comprising spaced rack gears fixed on said new cassette housing portion, pinion gears mounted on each of said slider means and respectively engaged with said rack gears, a drive motor, a transmission mechanism for transmitting the rotational force of said drive motor to one of said pinion gears, and a connecting rod connecting the pinion gears to rotate together, said transmission mechanism comprising a first and seconf link member each having one end pivotably connected to one another at a first pivot shaft, said first link member having its other end connected to a connecting portion of said connecting rod, a drive pulley mounted on the other end of said second link member, said drive motor driving said drive pulley, a middle pulley means on said first pivot shaft, a driven pulley on said connecting portion of said connecting rod, a first belt passing over said drive pulley and said middle pulley means, a second belt passing over said driven pulley and said middle pulley means such that the rotational force of said drive motor is transmitted via said drive pulley, said middle pulley means, said driven pulley and said first and second belts to drive said slider means.

11. A cassette changer mountable on a magnetic recording-reproduction apparatus, the magnetic recording-reproduction apparatus having a cassette inlet-outlet opening, the cassette changer comprising a new cassette housing portion for housing a plurality of new cassettes to be inserted into the cassette inlet-outlet opening for recording or reproduction, said plurality of new cassettes being stacked one above the other in vertical array, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivotable between a cassette discharge position where only the processed cassette housing portion faces said cassette inlet-outlet opening with said plurality of new cassettes stacked in said new cassette housing portion being supported on said separator and a cassette insertion position where said separator is pivoted downwardly from said cassette discharge position by the weight of said new cassettes and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, cassette withdrawing means for transferring said processed cassette from said cassette inlet-outlet opening into said processed cassette housing portion when said separator is in said cassette discharge position, cassette insertion means for transferring a lowermost of said vertically arrayed new cassettes in said new cassette housing portion into said cassette inlet-outlet opening when said separator is in said cassette insertion position, drive means for driving said cassette withdrawing means and said cassette insertion means, and cassette support means movable to underlie a second lowermost of said vertically arrayed new cassettes to support said second lowermost new cassette as said cassette insertion means transfers said lowermost new cassette into said inlet-outlet opening, said cassette support means being movable to a position displaced from underlying said second lowermost new cassettes upon said cassette withdrawing means transferring said processed cassette from said cassette inlet-outlet opening into said processed cassette housing portion, said cassette insertion means comprising spaced sliders which are movable while engaging the lowermost of said plurality of new cassettes, said sliders each having a top surface which are positioned so as to be flush with or higher than that of said separator when said separator is in said cassette discharge position, said top surfaces constituting said cassette support means, said cassette insertion means comprising a first and second link member each having one end pivotably connected to one another at a first pivot shaft, said first link member having its other end connected to a connecting rod which drives said sliders, a drive pulley mounted on the other end of said second link member, said drive means comprising a drive motor driving said drive pulley, a middle pulley means on said first pivot shaft, a driven pulley means on a connecting portion of said connecting rod, a first belt passing over said drive pulley and said middle pulley means, a second belt passing over said driven pulley and said middle pulley means such that the rotational force of said drive motor is transmitted via said drive pulley, said middle pulley means, said driven pulley and said first and second belts to drive said sliders.

12. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivotable between a cassette discharge position where only said processed cassette housing portion faces said cassette inlet-outlet opening with said new cassette in said new cassette housing portion being supported on said separator and a cassette insertion position where said separator is pivoted downwardly from sais cassette discharge position by the weight of said new cassette and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, said separator having a pivotal side end, said separator locking means comprising a projected piece provided on said pivotal side end of said separator, a lock member slidably movable between a locking position where said lock member contacts a contact surface of said projected piece and an unlocked position where said lock member moves away from said contact surface, and a lock member drive mechanism for driving said lock member between said locking and unlocked positions, cassette withdrawing means for transferring said processed cassette from said cassetts inlet-outlet opening into said processed cassette housing portion when said separator is in said cassette discharge position, cassette insertion means for transferring said new cassetts from said new cassette housing portion into said cassette inlet-outlet opening when said separator is in said cassette insertion position, and drive means for driving said cassette withdrawing means and said cassette insertion means 13. A cassette changer as defined in Claim 12, wherein said lock member drive mechanism comprises a lock spring biasing said lock member toward said locking position and an electromagnet for moving said lock member to said unlocked position against the bias of said lock spring.

14. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and pivotable between a cassette discharge position where only said processed cassette housing portion faces said cassette inlet-outlet opening with said new cassette in said new cassette housing portion being supported on said separator and a cassette insertion position where said separator is pivoted downwardly from said cassette discharge position by the weight of said new cassette and only said new cassette housing portion faces said cassette inlet-outlet opening, spring means for biasing said separator toward said cassette discharge position, separator locking means having a locking position for locking said separator in said cassette discharge position and an unlocked position which permits said separator to move to said cassette insertion position, said separator having a pivotal side end and an opposite end, said separator locking means comprising a lock member disposed in a position to face said opposite end of said separator and movable between said locking position where said lock member engages and supports said opposite end of said separator and said unlocked position where said lock member moves away from engaging said opposite end of said separator, and a lock member drive mechanism for driving said lock member between said locing and said unlocked positions, cassette withdrawing means for transferring said processed cassette from said cassette inlet-outlet opening into said processed cassette housing portion when said separator is in said cassette discharge position, cassette insertion means for transferring said new cassette from said new cassette housing portion into said cassette inlet-outlet opening when said separator is in said cassette insertion position, and drive means for driving said cassette withdrawing means and said cassette insertion means.

15. A cassette changer as defined in Claim 17, wherein said lock member drive mechanism comprises a lock spring biasing said lock member toward said locking position and an electromagnet for moving said lock member to said unlocked position against the bias of said lock spring.

16. A cassette changer as defined in Claim 14, wherein said cassette insertion means comprises slider means engageable with said new cassette, said lock member drive mechanism comprises a lock spring biasing said lock member toward said locking position, an operation rod slidably pushed by said slider means at the time of insertion of said new cassetts, and a locking release lever for converting the sliding movement of said operation rod into a rotational force and transmitting said rotational force to said lock member to move said lock member toward said unlocked position.

17. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and moveable between a cassette discharge position where said processed cassette housing portion faces said cassette inlet-outlet opening with said new cassette in said new cassette housing portion being supported on said separator and a cassette insertion position where said separator is moved from said cassette discharge position and said new cassette housing portion faces said cassette inlet-outlet opening, said separator having a front portion and a rear portion extending at an obtuse angle from said front portion, said rear portion supporting said new cassette when said separator is in said cassette discharge position, said front portion supporting said new cassette when said separator is in said cassette insertion position, separator locking means having a locking position for locking said separator in one of said positions and an unlocked position which permits said separator to move to the other of said positions, cassette withdrawing means for transferring said processed cassette from said cassette inlet-outlet opening into said processed cassette housing portion when said separator is in said cassette discharge position, and cassette insertion means for transferring said new cassette from said new cassette housing portion into said cassette inlet-outlet opening when said separator is in said cassette insertion position.

18. A cassette changer as defined in Claim 17, wherein said rear portion of said separator is substantially horizontally disposed and said front portion is inclined relative to horizontal when said separator is in said cassette discharge position, said front position being substantially horizontally disposed and said rear portion being inclined relative to horizontal when said separator is in said cassette insertion position.

19. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and movable between a cassette discharge position where said processed cassette housing portion faces said cassette inlet-outlet opening with said new cassette in said new cassette housing portion being supported on said separator and a cassette insertion position where said separator is moved from said cassette discharge position and said new cassette housing portion faces said cassette inlet-outlet opening, separator locking means having a locking position for locking said separator in one of said positions and an unlocked position which permits said separator to move to the other of said positions, cassette withdrawing means for transferring said processed cassette from said cassette inlet-outlet opening into said processed cassette housing portion when said separator is in said cassette discharge position, cassette insertion means for transferring said new cassette from said new cassette housing portion into said cassette inlet-outlet opening when said separator is in said cassette insertion position, and rive means for driving said cassette withdrawing means and said cassette insertion means, said cassette insertion means being movable between a first position and an insertion position spaced from said first position, said cassette insertion means carrying a new cassette support means which underlies and supports said new cassette in said new cassette housing portion when said cassette insertion means moves from said first position to said insertion postion.

20. A cassette changer as defined in Claim 19, wherein said new cassette support means slidably engages said new cassette in said new cassette housing portion as said cassette insertion means moves from said first position to said insertion position.

21. A cassette changer as defined in Claim 19, wherein said cassette insertion means is movable to a withdrawn position spaced from said first position, said new cassette support means being displaced from underlying said new cassette in said new cassette housing portion when said cassette insertion means is in said withdrawn position, said new cassette passing by gravity from said new cassette housing portion to a position on said separator when said cassette insertion means is in said withdrawn position, said new cassette in passing by gravity to said position on said separator effecting pivotal movement of said separator from its discharge position to its insertion position.

22. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproductioin, said new cassette housing portion having a front side and a rear side, said rear side being generally vertically disposed, said rear side having a lower terminating end, said front side having a generally vertically disposed upper section and a lower inclined section which is inclined relative to vertical, said new cassette having a front end and a rear end, a processed cassette housing portion underlying said new cassette housing portion for housing a processed cassette discharged from said cassette inlet-outlet opening after recording or reproduction, a separator provided in a boundary portion between said new cassette housing portion and said porcessed cassette housing portion and movable between a cassette discharge position where said processed cassette housing portion faces said cassette inlet-outlet opening with said new cassette in said new cassette housing portion being supported on said separator and a cassette insertion position where said separator is moved from said cassette discharge position and said new cassette housing portion faces said cassette inlet-outlet opening, said lower inclined section of said new cassette housing portion being disposed to engage said front end of said new cassette so that the rear end of said new cassette tilts downwardly when said separator is being pivoted from its discharge position to its insertion position by the weight of said new cassette, said lower inclined section effecting rearward displacement of said new cassette as said new cassette moves by gravity to a position disposed on said separator while said separator is in said insertion position, said rear end of said new cassette passing under said terminating end of said rear side of said new cassette housing portioin during said rearward displacement of said new cassette, separator locking means having a locking position for locking said separator in one of said positions and an unlocked position which permits said separator to move to the other of said positions, cassette withdrawing means for transferring said processed cassette from said cassette inlet-outlet opening into said processed cassette housing portion when said separator is in said cassette discharge position, and cassette insertion means for transferring said new cassette from said new cassette housing portion into said cassette inlet-outlet opening when said separator is in said cassette insertion position.

23. A cassette changer as defined in Claim 22, wherein said vertically disposed rear side of said new cassette housing portion and said vertically disposed upper section of said front side of said new cassette housing portion are spaced from one another a first distance, said new cassette having a width extending between said front and rear ends approximately equal to said first distance, said lower inclined section extending downwardly from said upper section and toward said vertically disposed rear side of said new cassette housing portion.

24. The cassette changer as defined in claim 22, wherein said lower inclined section extends below the level of said terminating end of said rear side of said new cassette housing portion.

25. A cassette changer mountable on a magnetic recording-reproduction apparatus, the magnetic recording-reproduction apparatus having a cassette inlet-outlet opening, the cassette changer comprising a new cassette housing portion for housing a new cassette to be inserted into the cassette inlet-outlet opening for recording or reproduction, a processed cassette housing portion underlying said new cassette housing portion for housing a processed cassette discharged from said cassette inlet-outlet opening after recording or reproduction, a separator provided in a boundary portion between said new cassette housing portion and said processed cassette housing portion and movable between a cassette discharge position where said processed cassette housing portion faces said cassette inlet-outlet opening with said new cassette in said new cassette housing portion being supported on said separator and a cassette insertion position where said separator is moved from said cassette discharge position and said new cassette housing portion faces said cassette inlet-outlet opening, locking means having a locking position for locking said separator in said discharge position and an unlocked position which permits cassette withdrawing means for transferring said processed cassette from said cassette inlet-outlet opening into said processed cassette housing portion when said separator is in said cassette discharge position, and cassette insertion means for transferring said new cassette from said new cassette housing portion into said cassette inlet-outlet opening when said searator is in said cassette insertion position, and drive means for driving said cassette withdrawing means and said cassette insertion means, said separator to move to said insertion position, said cassette insertion means being movable between a first and second position, said cassette insertion means having actuating means operable to actuate said locking means so that when said cassette insertion means is moved from said first to said second position, said locking means is actuated from its locking to its unlocked position.

26. a cassette changer as defined in Claim 25, wherein said cassette insertion means has a third position which is its position upon insertion of said new cassette in said inlet-outlet opening, said cassette insertion means being movable in one direction from said first position to said third position to insert said cassette in said inlet-outlet opening, said cassette insertion means being movable in an opposite direction from said first position to said second position to actuate said locking means from its locking position to its unlocked position.

* * * * *